(12) United States Patent
Tsukada

(10) Patent No.: US 9,830,585 B2
(45) Date of Patent: *Nov. 28, 2017

(54) RECEIPT ISSUING DEVICE, CONTROL METHOD FOR A RECEIPT ISSUING DEVICE, PRINTING DEVICE, AND CONTROL METHOD FOR A PRINTING DEVICE

(71) Applicant: Seiko Epson Corporation, Shinjuku-ku (JP)

(72) Inventor: Toshihiro Tsukada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 214 days.

This patent is subject to a terminal disclaimer.

(21) Appl. No.: 14/585,670

(22) Filed: Dec. 30, 2014

(65) Prior Publication Data

US 2015/0112824 A1  Apr. 23, 2015

Related U.S. Application Data

(63) Continuation of application No. 12/543,413, filed on Aug. 18, 2009, now Pat. No. 8,953,195.

(30) Foreign Application Priority Data

Aug. 18, 2008 (JP) ................................. 2008-209512

(51) Int. Cl.
G06Q 20/20 (2012.01)
G07G 1/12 (2006.01)

(52) U.S. Cl.
CPC ......... *G06Q 20/209* (2013.01); *G06Q 20/202* (2013.01); *G07G 1/12* (2013.01)

(58) Field of Classification Search
None
See application file for complete search history.

(56) References Cited

U.S. PATENT DOCUMENTS

2001/0019953 A1  9/2001 Furukawa et al.
2003/0103790 A1*  6/2003 Murase ........................... 400/76
(Continued)

FOREIGN PATENT DOCUMENTS

CN  1497424 A  5/2004
JP  2003-251595 A  9/2003
(Continued)

*Primary Examiner* — Ming Hon
(74) *Attorney, Agent, or Firm* — Kilpatrick Townsend & Stockton LLP

(57) ABSTRACT

A receipt issuing device, control method for a receipt issuing device, printing device, and a control method for a printing device can eliminate issuing unnecessary receipts without requiring changing the application of the host device. A transaction information reception unit 61 receives transaction information from a host device 2 that outputs transaction information and specific commands. A transaction identification command reception unit 62 receives a specific command after the transaction information is received. A decision unit 64 decides whether or not to issue a receipt R based on whether or not the specific command was received and/or the content received. A receipt issuing unit 65 prints the transaction information and issues a receipt R when the decision unit 64 decides to issue a receipt.

18 Claims, 5 Drawing Sheets

(56) References Cited

U.S. PATENT DOCUMENTS

| | | |
|---|---|---|
| 2003/0209599 A1* | 11/2003 | Gatto .............................. 235/379 |
| 2004/0112236 A1 | 6/2004 | Yokoyama et al. |
| 2005/0154646 A1* | 7/2005 | Chermesino .................... 705/26 |
| 2005/0271446 A1 | 12/2005 | Minowa |
| 2009/0271322 A1* | 10/2009 | Lay et al. ....................... 705/75 |
| 2012/0316950 A1 | 12/2012 | LaPorte et al. |
| 2012/0323711 A1 | 12/2012 | Fandel et al. |

FOREIGN PATENT DOCUMENTS

| | | |
|---|---|---|
| JP | 2004-151838 A | 5/2004 |
| JP | 2005-056143 A | 3/2005 |
| JP | 2006-346946 A | 12/2006 |

\* cited by examiner

RECEIPT ISSUING DEVICE, CONTROL METHOD FOR A RECEIPT ISSUING DEVICE, PRINTING DEVICE, AND CONTROL METHOD FOR A PRINTING DEVICE

This application is a continuation of U.S. patent application Ser. No. 12/543,413, filed Aug. 18, 2009, which claims priority to Japanese Patent Application No. 2008-209512, filed Aug. 18, 2008, the entire disclosures of which are incorporated by reference herein.

BACKGROUND

1. Technical Field

The present invention relates to a receipt issuing device for issuing receipts related to products purchased by customers, to a control method for a receipt issuing device, to a printing device, and to a control method for a printing device.

2. Related Art

Systems for executing transaction processes (payment processes) for products purchased by a customer in a store, for example, and issuing receipts using the transaction information (payment information) as the printed information, are known from the literature. Japanese Unexamined Patent Appl. Pub. JP-A-2004-151838, for example, teaches a receipt issuing system that uses a receipt issuing method whereby the customer can selectively have a paper receipt issued and/or an electronic receipt issued, or can indicate that a receipt is not needed. This system displays choices for "no receipt," "electronic receipt," or "paper and electronic receipts" on the display unit (a display unit that displays information for the customer) of a POS (point-of-sale) computer, and issues a receipt as requested by the customer (or does not issue any receipt) in accordance with the selection made by the user. If the customer does not make a selection, this system issues a receipt printed on receipt paper (a paper receipt).

A problem with the foregoing system is that the customer must select a receipt issuing method each time a purchase is made (each time a payment is made), and this tends to become tedious. As a result, customers that don't actually need a receipt (such as customers that pay using a mobile terminal or electronic wallet with a transaction processing function, or pay using a smart (IC) card, e-money, or other electronic payment processing) commonly end transactions without selecting the appropriate receipt issuing method (electronic receipt or no receipt), and an unnecessary receipt (paper receipt) is issued as a result.

A further problem with the foregoing method is that the application run on the POS terminal side must be modified to achieve the functionality enabling selecting the receipt issuing method, and the deployment cost of such a system therefore rises.

SUMMARY

The receipt issuing device, receipt issuing system, printing device, and control method for a printing device according to at least of one embodiment of the present invention enable eliminating issuing unnecessary receipts without requiring changing the application run on the host device or requiring selecting if a receipt is required or not required. A receipt issuing device according to a first aspect of the invention can be connected to a host device and includes a transaction information reception unit that receives transaction information from a host device that outputs transaction information and specific commands; a command reception unit that receives a specific command after receiving transaction information; a decision unit that decides whether or not to issue a receipt based on whether or not the specific command is received and/or the content of the specific command; and a receipt issuing unit that prints the transaction information and issues a receipt when the decision unit decides to issue a receipt.

The above-mentioned the transaction information reception unit and the command reception unit are physically acceptable also in one reception unit. To have divided into two reception units functionally to explain plainly, it explains.

This aspect of the invention determines whether or not to issue a receipt based on whether a specific command has been received and/or the received content (the content of the specific command, such as content identifying a transaction method), and issues a receipt only when issuing a receipt has been decided. For example, by issuing a receipt if the specific command is a command identifying a cash transaction (including transactions using cash, prepaid cards, checks, or other cash-like instruments) or a command identifying a delayed settlement, such as a credit card transaction, and not issuing a receipt when the command (or content) indicates an electronic transaction, receipts are issued only when a receipt is typically required, such as for cash purchases, and issuing unnecessary receipts can be eliminated.

Furthermore, because whether or not to issue a receipt is determined based on whether or not a specific command has been received and/or the content of the specific command, the customer or store clerk does not need to perform a specific operation and is not burdened with making a selection.

In addition, by using existing commands as the specific commands, there is no need to add a special function related to issuing receipts to the host device, at least of one embodiment of the invention can be deployed without changing the host device application, and the cost of introduction can be suppressed.

In a receipt issuing device according to another aspect of the invention, the decision unit preferably decides to issue a receipt when the specific command includes a command identifying a cash transaction or a delayed-settlement transaction such as a credit card transaction.

This aspect of the invention enables issuing receipts only when a receipt is generally required (when the customer generally requests a receipt), such as when making a cash or credit card purchase.

In a receipt issuing device according to another aspect of the invention, the specific command preferably includes a command that is generated by a process of the host device in conjunction with a cash transaction or a credit card or other delayed-settlement transaction.

In a receipt issuing device according to another aspect of the invention, the specific command is preferably a command for driving an external device, such as a cash drawer, connected to the receipt issuing device.

By using commands that are generated in conjunction with operations that are performed when processing cash transactions, check transactions, and credit or other delayed-settlement transactions as the specific commands, receipts can be issued appropriately without needing to change the application on the host device (without adding a special function).

More particularly, because driving (opening) the cash drawer can generally be interpreted to mean a cash transaction or check transaction, using a command accompanying driving the cash drawer as a command for determining whether or not to issue a receipt is efficient.

In a receipt issuing device according to another aspect of the invention, the decision unit decides to not issue a receipt when the specific command is a command identifying an electronic transaction.

When electronic transactions using mobile terminals with a payment processing function, digital wallets, smart cards or IC cards, e-money, and similar electronic payment, the host device generally writes a digital receipt or transaction information to memory in the electronic payment, and a paper receipt is typically not needed. Therefore, by not issuing a receipt when an electronic transaction is processed, issuing unnecessary receipts can be eliminated.

Another aspect of the invention is a receipt issuing device having a reception unit that receives transaction information and commands from a host device, a command reception evaluation unit that determines if a specific command capable of identifying the transaction method is received within a specific time after transaction information is received from the host device, a decision unit that decides whether or not to issue a receipt based on the result from the command reception evaluation unit, and a receipt issuing unit that prints the transaction information on receipt paper and issues a receipt when the decision unit decides to issue a receipt.

The decision unit decides whether or not to issue a receipt based on whether the command reception unit receives the specific command within a specific time after the transaction information reception unit received the transaction information.

This aspect of the invention determines whether or not to issue a receipt based on whether or not a specific command is received within a specific time. For example, if the specific command denotes a cash transaction or a credit card or other delayed-settlement transaction, a receipt is issued, but a receipt is not issued if the command identifies an electronic transaction. Whether or not to issue a receipt can therefore be determined without requiring the customer or store clerk to perform a specific operation, and issuing unnecessary receipts can be eliminated. There is also no need to change the application executed by the host device.

A receipt issuing system according to at least of one embodiment of the present invention includes the receipt issuing device described above and a host device.

This aspect of the invention provides a receipt issuing system that can eliminate issuing unnecessary receipts without needing to change the application of the host device.

Another aspect of the invention is a printing device that is connectable to a host device, including a printing information reception unit that receives printing information from the host device; a printing unit that prints the printing information; a command reception unit that receives a specific command; a decision unit that decides whether or not to print the printing information based at least on whether or not the specific command is received and/or the content of the specific command. The printing unit prints the printing information when the decision unit decides to print the printing information.

A control method for a printing device according to at least of one embodiment of the present invention decides whether or not to print the printing information based on whether or not a specific command is received after printing information is received from the host device and/or the content of the received command.

Another aspect of the invention is a control method for a printing device that is connectable to a host device, including steps of deciding whether or not to print the printing information based at least on whether or not a specific command is received and/or the content of the specific command after printing information is received from the host device, and printing or not printing the printing information based on the decision.

The configurations and methods of these aspects of at least of one embodiment of the invention determine whether or not to print the printing information based at least on whether a specific command has been received and/or the content of the specific command (such as identifying a transaction method). For example, when the printing information is information for printing (issuing) a receipt, by printing a receipt (issued) when the specific command is a command (or content) identifying a cash transaction or a credit card or other transaction that is settled at a later date, and not printing a receipt when the command (or content) identifies an electronic transaction, receipts can be printed only when a receipt is required and printing unnecessary receipts can be eliminated.

Furthermore, because whether or not the printing information is printed is determined based on whether or not a specific command has been received and/or the content of the specific command, the customer or store clerk does not need to perform a specific operation and is not burdened with making a selection.

In addition, by using existing commands as the specific commands, there is no need to add a special function to the host device, at least of one embodiment of the invention can be deployed without changing the host device application, and the cost of introduction can be suppressed.

Other objects and attainments together with a fuller understanding of the invention will become apparent and appreciated by referring to the following description and claims taken in conjunction with the accompanying drawings.

DESCRIPTION OF EMBODIMENTS

A receipt issuing device and a receipt issuing system according to a first embodiment of the invention are described below with reference to the accompanying figures.

Figure 1:
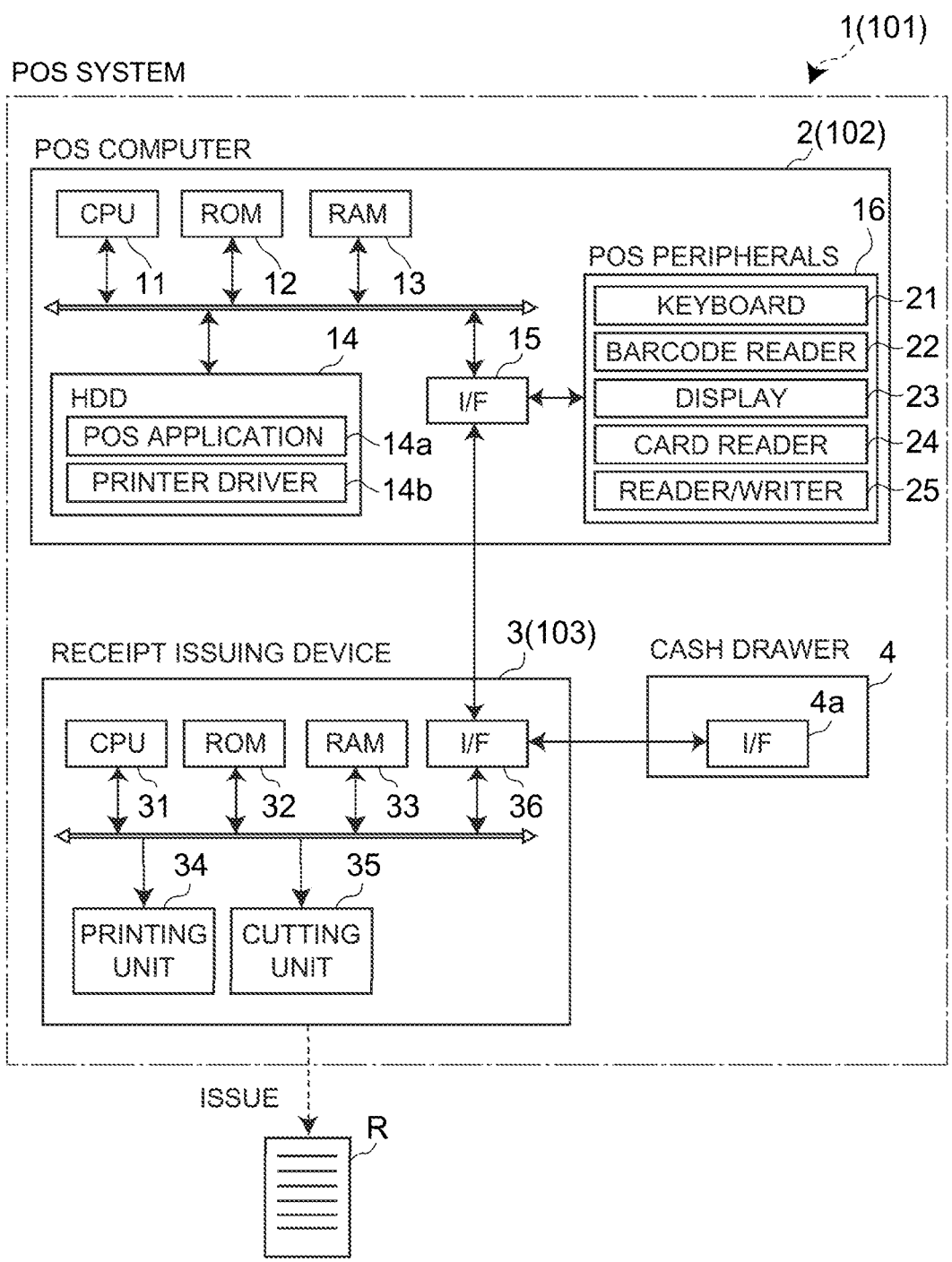
FIG. 1 is a control block diagram of a POS system according to a first embodiment of the invention.

FIG. 1 is a control block diagram showing a first embodiment of a POS system 1 as an application of a receipt issuing system according to at least of one embodiment of the present invention. As shown in FIG. 1 the POS system 1 includes a POS computer 2 (host device), a receipt issuing device 3 (printing device), and a cash drawer 4.

The POS computer 2 processes transactions for product purchases, and has a CPU 11 (central processing unit), ROM 12 (read-only memory), RAM 13 (random access memory), hard disk drive 14, a communication interface 15, and other POS peripherals 16.

The CPU 11 controls overall operation of the POS computer 2. Control data and control programs used by the CPU 11 to execute particular processes are stored in ROM 12. RAM 13 is used as working memory by the CPU 11 for executing processes. The hard disk drive 14 stores a POS application 14a and a printer driver 14b. The POS application 14a is the program for processing sales transactions, and includes a control program for controlling the POS peripherals 16. The printer driver 14b controls printing, including receipt printing. The interface 15 connects the POS peripherals 16 and the receipt issuing device 3.

The POS peripherals 16 include a keyboard 21 used by an operator to input product information, a barcode reader 22 for reading barcodes that are applied to or preprinted on the products, a display 23 (including a customer display and operator display) for displaying the input product information, for example, a card reader 24 for reading member cards and credit cards presented by customers, and a reader/writer 25 enabling primarily contactlessly reading and writing media that enable electronic transaction processing and are carried by customers (such as smart cards, digital wallets, and cell phones or other portable devices with a digital wallet function, collectively referred to herein as "e-money" media), connected through a common interface 15. Note that the reader/writer 25 may be contact reading/writing device.

The CPU 11 retrieves product information for the purchased products from a POS server (not shown in the figure) based on information input through the keyboard 21 or the barcode read with the barcode reader 22. The CPU 11 also generates transaction information based on the product information acquired in conjunction with the POS application 14a, and sends the resulting transaction information through the interface 15 to the receipt issuing device 3.

The cash drawer 4 holds paper currency and change, checks, gift certificates, and other instruments used for payment transactions, and is connected to the receipt issuing device 3 through an interface 4a. In this embodiment of the invention the cash drawer 4 is opened (is driven) only when a cash (including checks and gift certificates) payment is received. The cash drawer 4 is locked by a lock mechanism, and the lock mechanism can be disengaged and the cash drawer 4 opened by driving an electronic solenoid. A command for opening the cash drawer 4 is sent to the receipt issuing device 3 following the transaction information from the POS application 14a of the POS computer 2. Based on this command the receipt issuing device 3 sends a drive signal to drive the electronic solenoid to the cash drawer 4 to unlock the lock.

The receipt issuing device 3 issues receipts R for purchased products, and has a CPU 31, ROM 32, RAM 33, printing unit 34, cutting unit 35, and interface 36. The CPU 31 controls the overall operation of the receipt issuing device 3. The ROM 32 stores a control program and control data enabling the CPU 31 to execute various processes. The RAM 33 is used as working memory when the CPU 31 executes a process.

The interface 36 connects the POS computer 2 and cash drawer 4. The CPU 31 receives transaction information and commands from the POS computer 2. The CPU 31 drives the cash drawer 4 connected through the interface 36 (that is, controls opening the cash drawer 4). The printing unit 34 has a print head, and functions as a printing unit for printing transaction information on receipt paper. The cutting unit 35 functions as a paper cutting unit for cutting the receipt paper after printing is completed.

Figure 2:
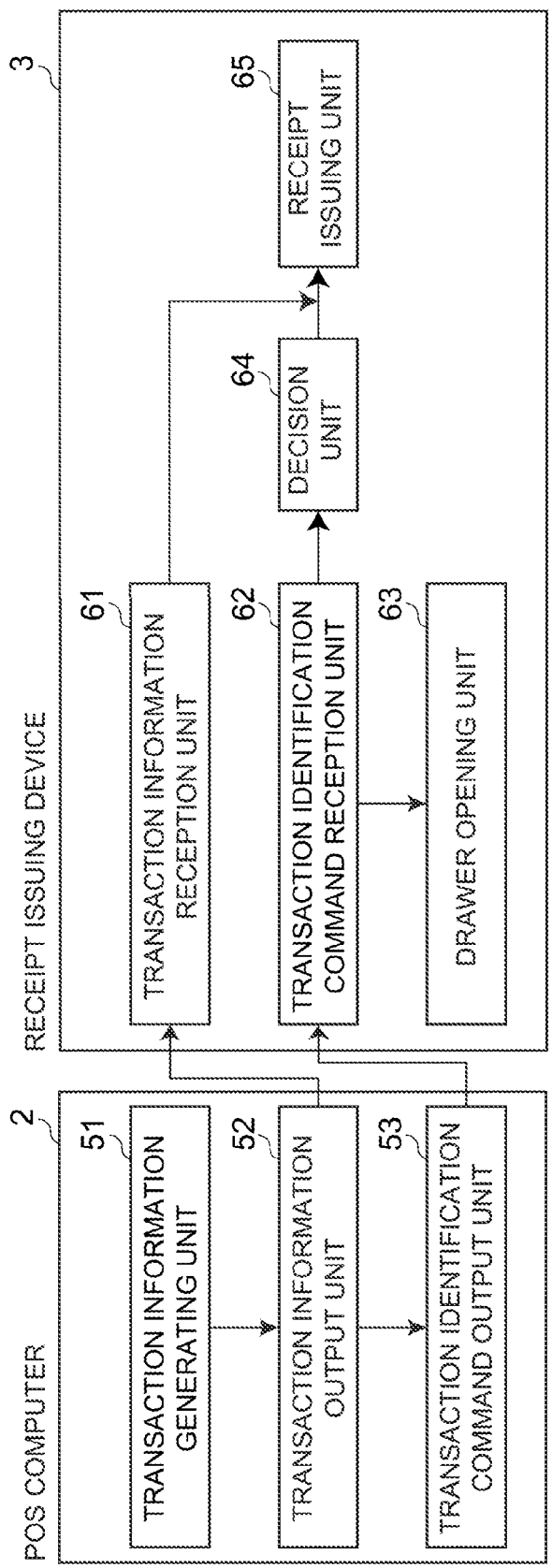
FIG. 2 is a block diagram of the functional configuration of a POS computer and receipt issuing device.

The functional configuration of the POS computer 2 and receipt issuing device 3 is described next with reference to the function block diagram in FIG. 2. As shown in FIG. 2 the POS computer 2 has a transaction information generating unit 51, a transaction information output unit 52, and a transaction identification command output unit 53. The transaction information generating unit 51 generates the transaction information required to print a receipt R based on the product information acquired from the POS server. The transaction information output unit 52 sends the resulting transaction information to the receipt issuing device 3.

The transaction identification command output unit 53 sends a command (referred to herein as a "transaction identification command" (specific command)) identifying the transaction method (cash payment, credit card transaction, or e-money) to the receipt issuing device 3. This transaction identification command results from operations during the payment process, and is sent as a command (referred to herein as a "drawer opening command") for opening the cash drawer 4 to the receipt issuing device 3 when a cash transaction is processed, as a command indicating that a credit card was read (a "credit card read command" herein) when a credit card transaction is processed, and as a command indicating that an e-money medium was read when e-money media is received (an "electronic media read command" herein).

The receipt issuing device 3 includes a transaction information reception unit 61, a transaction identification command reception unit 62 (command reception unit), a drawer opening unit 63, a decision unit 64, and a receipt issuing unit 65.

The transaction information reception unit 61 receives transaction information for issuing a receipt R from the POS computer 2.

The transaction identification command reception unit 62 receives a transaction identification command (the drawer opening command, credit card read command, or electronic media read command) from the POS computer 2.

The drawer opening unit 63 opens the cash drawer 4 (so that cash, checks, and the like can be inserted or removed) if the transaction identification command received by the transaction identification command reception unit 62 is a drawer opening command.

The decision unit 64 determines whether or not to issue a receipt R based on the transaction identification command received by the transaction identification command reception unit 62 (based on the received content of the transaction identification command). If the decision unit 64 decides to issue a receipt R, the receipt issuing unit 65 prints the transaction information on receipt paper to issue the receipt R, and then deletes (destroys) the transaction information stored in RAM 33, for example, after the receipt R is issued. If the decision unit 64 decides to not issue a receipt R, the transaction information is deleted (destroyed) and the receipt R is not issued. Note that the main units of the receipt issuing unit 65 are rendered by the CPU 31, printing unit 34, and cutting unit 35 described above.

The above-mentioned the transaction information reception unit 61 (transaction information reception unit) and the transaction identification command reception unit 62 (command reception unit) are physically acceptable also in one reception unit (in FIG. 1, the interface 36). To have divided into two reception units functionally to explain plainly, it explains.

Figure 3:
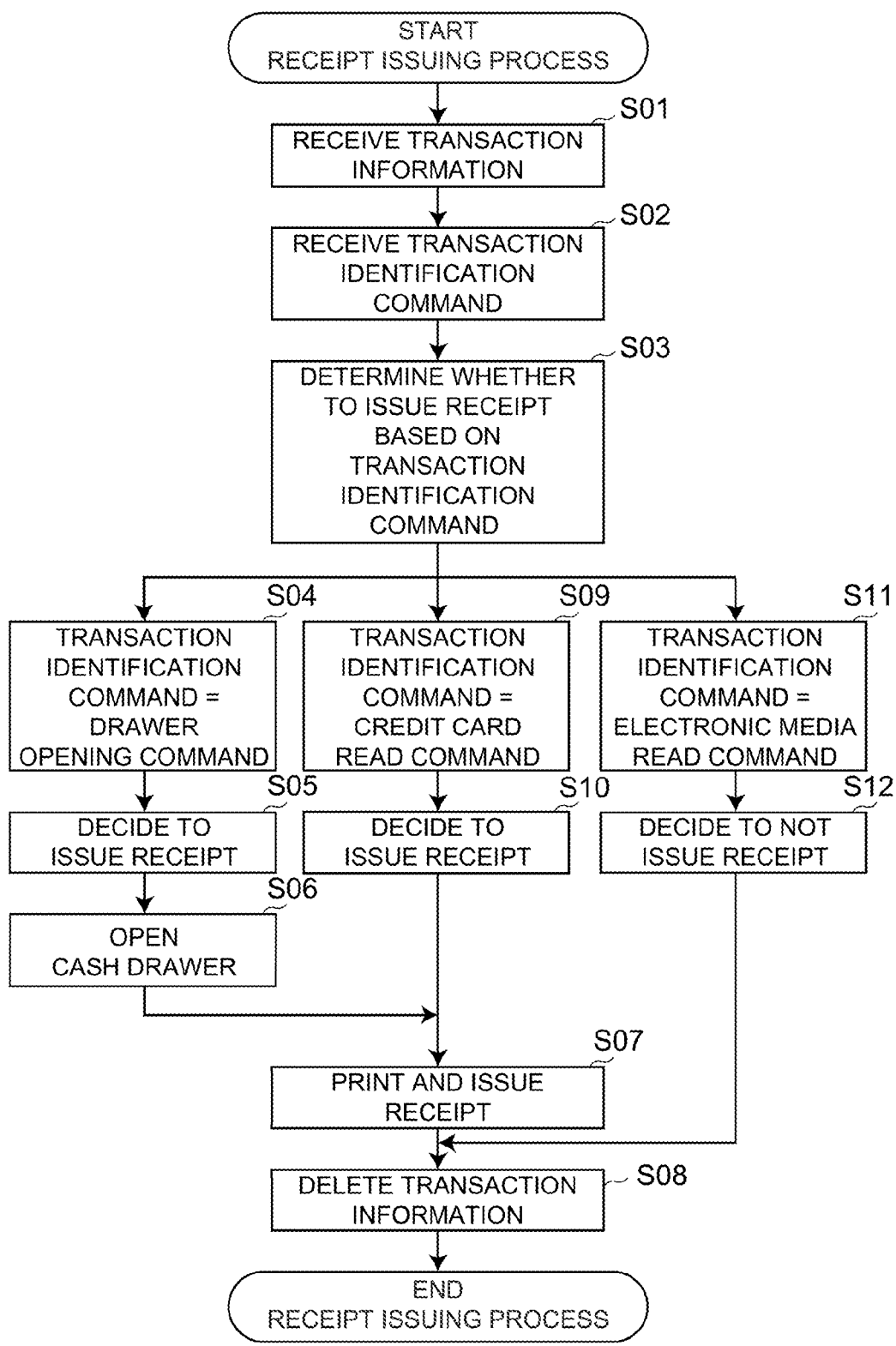
FIG. 3 is a flow chart of the receipt issuing process according to a first embodiment of the invention.

The process (receipt issuing process) of issuing a receipt R by the receipt issuing device 3 (the control method of the receipt issuing device 3 (printing device)) is described next with reference to the flow chart in FIG. 3.

The receipt issuing device 3 first receives transaction information from the POS computer 2 (S01). After receiving the transaction information, the receipt issuing device 3 receives a transaction identification command from the POS computer 2 (S02). Based on the received transaction identification command, the receipt issuing device 3 then determines whether or not to issue a receipt R (S03).

If the received transaction identification command is a drawer opening command indicating a cash transaction (S04), the receipt issuing device 3 decides to issue a receipt R (S05). The receipt issuing device 3 then opens the cash drawer 4 (S06), prints the received transaction information on receipt paper, and issues a receipt R (S07). The receipt issuing device 3 then deletes the transaction information stored in RAM 33 (S08), for example, and ends the receipt issuing process.

Because opening the cash drawer 4 generally indicates a cash transaction, the drawer opening command is used as a command identifying a cash transaction, and is effective as a standard for determining whether or not to issue a receipt R.

If the received transaction identification command is a credit card read command indicating a credit card transaction (S09), the receipt issuing device 3 decides to issue a receipt R (S10). The receipt issuing device 3 then prints the received transaction information on receipt paper, and issues a receipt R (S07), then deletes the transaction information stored in RAM 33 (S08), for example, and ends the receipt issuing process.

However, if the received transaction information is an electronic media read command indicating an e-money transaction (S11), the receipt issuing device 3 decides not to issue a receipt R (S12). The receipt issuing device 3 then deletes the transaction information stored in RAM 33 (S08), for example, without issuing a receipt R, and ends the receipt issuing process.

This first embodiment of the invention thus determines whether or not to issue a receipt R based on a command identifying the transaction method (transaction identification command), and issues a receipt R only after determining that a receipt R is to be issued. By issuing a receipt R when the transaction identification command is a command identifying a cash transaction or a credit card transaction, a receipt R can be issued only when a receipt R is generally required (situations when customers generally request a receipt R). In addition, because a receipt R is generally not needed when paying by e-money, issuing unnecessary receipts R can be eliminated by not issuing a receipt R when the transaction identification command is a command identifying an e-money transaction. Furthermore, because whether or not a receipt R is issued is determined from the transaction method, neither the customer nor the store clerk needs to perform any special operation, and no burden is therefore imposed.

Furthermore, by using commands that are already used in transaction processes as the transaction identification command (specific command), there is no need to add a specific function related to issuing receipts R to the POS computer 2, the method of at least one embodiment of the invention can be employed without modifying the POS application 14a of the POS computer 2, and the cost of deployment (introduction) can be suppressed.

Embodiment 2

The receipt issuing process of a POS system 101 according to a second embodiment of the invention is described next with reference to FIG. 4 and FIG. 5. The basic configuration of the POS system 101 according to this second embodiment is the same as the POS system 1 of the first embodiment shown in FIG. 1, and differs in that the receipt issuing device 103 has a timekeeping unit (not shown in the figure).

The receipt issuing process of the POS system 101 according to this second embodiment of the invention determines whether or not to issue a receipt R based on whether or not a transaction identification command was received within a specific time after the receipt issuing device 103 received the transaction information from the POS computer 102.

The receipt issuing process of the receipt issuing device 103 (the control method of the receipt issuing device 103) according to this second embodiment of the invention is described next with reference to the flow chart in FIG. 4 and FIG. 5. Note that FIG. 4 is a flow chart of operation when the transaction identification command is a command that identifies a cash transaction (drawer opening command) or a command that identifies a credit card transaction (credit card read command), and FIG. 5 is a flow chart of operation when the transaction identification command is a command that identifies an e-money transaction (electronic media read command).

Figure 4:
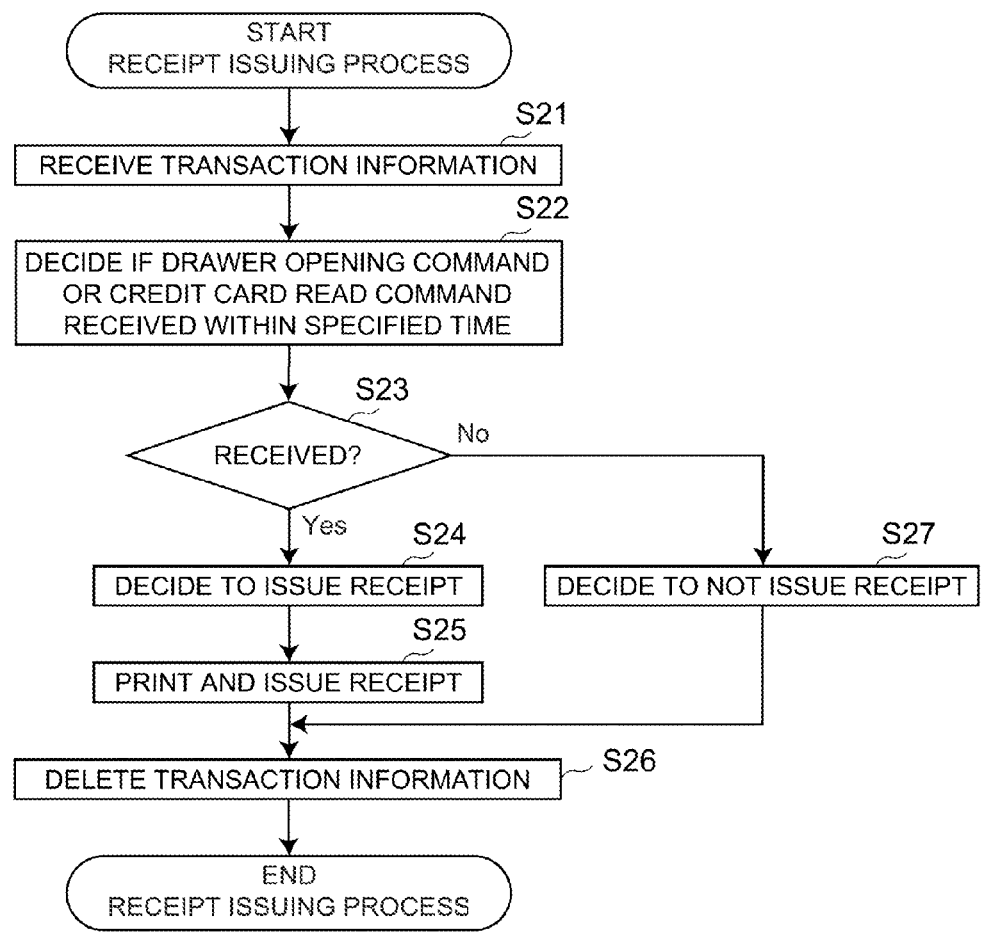
FIG. 4 is a flow chart of the receipt issuing process according to a second embodiment of the invention.

As shown in FIG. 4, the receipt issuing device 103 first receives transaction information from the POS computer 102 (S21). The receipt issuing device 103 then determines if a drawer opening command or credit card read command is received within a specific time after the transaction information is received (S22, command reception determination unit). If the drawer opening command or credit card read command is received within the specified time (S23 returns Yes), the receipt issuing device 103 decides to issue a receipt R (S24, decision unit), prints the received transaction information on receipt paper, and issues a receipt R (S25, receipt issuing unit). The receipt issuing device 103 then deletes the transaction information stored, for example, in RAM 33 (S26), and ends the receipt issuing process.

If the drawer opening command or credit card read command is not received within the specified time (S23 returns No), the receipt issuing device 103 decides to not issue a receipt R (S27, decision unit). The receipt issuing device 103 then deletes the transaction information stored in RAM 33 (S26), for example, without issuing a receipt R, and ends the receipt issuing process.

Figure 5:
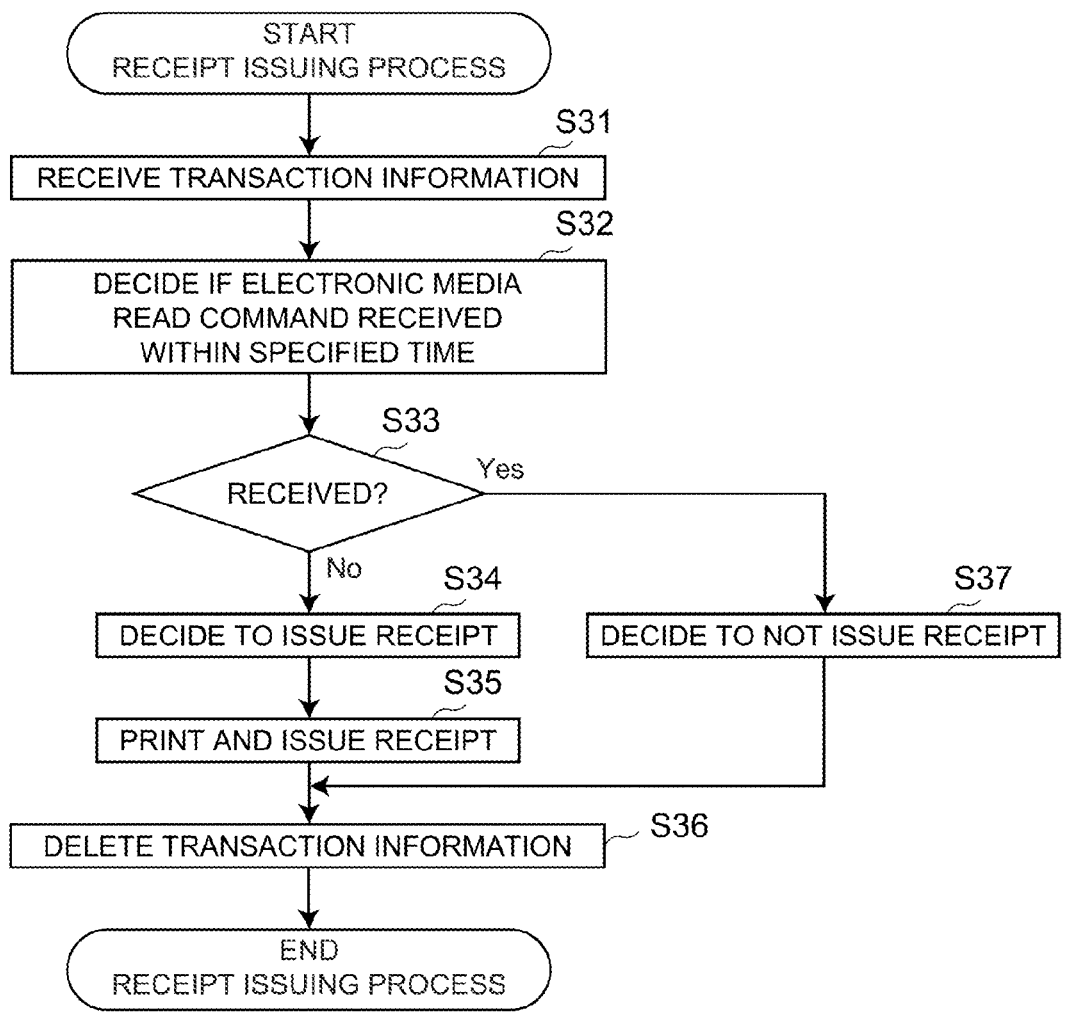
FIG. 5 is a flow chart of the receipt issuing process according to a second embodiment of the invention.

The operation described in FIG. 5 is described next. The receipt issuing device 103 first receives transaction information from the POS computer 102 (S31). The receipt issuing device 103 then determines if an electronic media read command is received within a specific time after the transaction information is received (S32). If the electronic media read command is not received within the specified time (S33 returns No), the receipt issuing device 103 decides to issue a receipt R (S34), prints the received transaction information on receipt paper, and issues a receipt R (S35). The receipt issuing device 103 then deletes the transaction information stored, for example, in RAM 33 (S36), and ends the receipt issuing process.

However, if the electronic media read command is received within the specified time (S33 returns Yes), the receipt issuing device 103 decides to not issue a receipt R (S37). The receipt issuing device 103 then deletes the transaction information stored in RAM 33 (S36), for example, without issuing a receipt R, and ends the receipt issuing process.

The receipt issuing device 103 according to this second embodiment of the invention thus issues a receipt R if a command identifying a cash transaction or a credit card transaction is received within a specified time, and does not issue a receipt R if the command is not received. Alternatively, a receipt R is issued if a command identifying an e-money transaction is not received within a specified time, and a receipt R is not issued if the command is received. As a result, whether to issue or not issue a receipt R can be decided without requiring the intervention of the customer or store clerk, and issuing unnecessary receipts R can be eliminated.

A drawer opening command (cash transaction), credit card read command (credit card transaction), and electronic media read command (e-money transaction) are used as commands identifying the transaction process in the foregoing embodiments of the invention (first embodiment and second embodiment), but the invention is not so limited and any command (such as a command generated by pressing a specific key used in the transaction process) that is produced by an operation accompanying the transaction process in the POS computer 2 (102) may be used instead.

It will be obvious to one with ordinary skill in the related art that the device configuration and process steps executed by the POS system 1 (101), the device configuration and process steps executed by the receipt issuing device 3 (103), and the control method of the embodiments described above can be modified in many ways without departing from the scope of the accompanying claims.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A receipt issuing device, comprising:
   an interface configured to be connectable to a host device;
   a central processing unit configured to receive a command and transaction information from the host device through the interface, and configured to decide whether or not to issue a receipt based at least on whether or not received command is a specific command, wherein the specific command corresponds to a method of payment; and
   a receipt issuing unit configured to print the transaction information when the central processing unit decides to issue a receipt.

2. The receipt issuing device described in claim 1, wherein:
   the central processing unit decides that the received command is the specific command when the received command respects to a cash payment process or a delayed-settlement payment process.

3. The receipt issuing device described in claim 1, wherein:
   the central processing unit decides that the received command is not the specific command when the received command respects to print the transaction information.

4. The receipt issuing device described in claim 1, further comprising:
   an interface configured to be connectable to an external device; and
   wherein the central processing unit decides that the received command is the specific command when the received command respects to send a signal to the external device.

5. The receipt issuing device described in claim 1, wherein:
   the central processing unit decides that the received command is not the specific command when the received command respects to an electronic payment process.

6. The receipt issuing device described in claim 1, wherein:
   the central processing unit decides whether or not to issue a receipt based on whether the central processing unit receives the specific command within a specific time after the central processing unit received the transaction information.

7. A printing device, comprising:
   an interface configured to be connectable to a host device;
   a central processing unit configured to receive a command and printing information from the host device through the interface; and
   a printing unit configured to print the printing information;
   wherein the central processing unit is further configured to decide whether or not to print the printing information based at least on whether or not received command is the specific command, wherein the specific command corresponds to a method of payment, and
   wherein the printing unit prints the printing information when the central processing unit decides to print the printing information.

8. The printing device described in claim 7, wherein:
   the specific command respects to a cash payment process or a delayed-settlement payment process.

9. The printing device described in claim 7, wherein:
   the specific command does not respect to print the printing information.

10. The printing device described in claim 7, further comprising:
    an interface configured to be connectable to an external device; and
    wherein the specific command respects to send a signal to the external device.

11. The printing device described in claim 7, wherein:
    the specific command does not respect to an electronic payment process.

12. The printing device described in claim 7, wherein:
    the central processing unit decides whether or not to print the printing information based on whether the central processing unit receives the specific command within a specific time after the central processing unit received the printing information.

13. A control method for a printing device, comprising:
    receiving printing information from a host device through an interface;
    receiving a command from the host device;
    deciding whether or not to print the printing information based at least on whether or not received command is a specific command, wherein the specific command corresponds to a method of payment; and
    printing or not printing the printing information based on the decision.

14. The control method for a printing device described in claim 13, further comprising:

deciding to print the printing information when the specific command respects to a cash payment process or a delayed-settlement payment process.

15. The control method for a printing device described in claim 13, further comprising:
deciding to print the printing information when the specific command does not respect to print the printing information.

16. The control method for a printing device described in claim 13, further comprising:
deciding to print the printing information when the specific command respects to send a signal to an external device connected to the printing device.

17. The control method for a printing device described in claim 13, further comprising:
deciding to not print the printing information when the specific command respects to an electronic payment process.

18. The control method for a printing device described in claim 13, further comprising:
deciding whether or not to print the printing information based on whether the specific command is received within a specific time after the printing information is received.

* * * * *